Dec. 26, 1950  R. C. PALMER  2,535,228

FEED ADJUSTMENT DEVICE

Filed Aug. 25, 1949

*INVENTOR.*
RAYMOND C. PALMER

BY *Wallace and Cannon*

ATTORNEYS

Patented Dec. 26, 1950

2,535,228

UNITED STATES PATENT OFFICE 2,535,228

FEED ADJUSTMENT DEVICE

Raymond C. Palmer, Chicago, Ill.

Application August 25, 1949, Serial No. 112,355

8 Claims. (Cl. 74—409)

This invention relates to adjustment devices and more particularly to adjustment devices of a type particularly well adapted for adjusting the feed mechanism of machine tools and the like.

In adjusting the feed of machine tools, to thereby position the position of the cutting tools and the like, it is important for the performance of accurate machining that such adjustments be made accurately, and that, when the accurate adjustments are once made, they be maintained during the subsequent operation of the machine. It is a primary object of my invention to enable such accurate adjustments, and such maintenance of accurate adjustments, to be effected.

Various types of adjustment devices have been heretofore used or resorted to in adjusting the feed of different machine tools such as, for example in making vertical adjustments of the spindle in a milling machine, or the like. However, one of the major problems heretofore experienced in the art has been to eliminate backlash in the adjusting device which backlash, as is well known to those skilled in the art, is seriously detrimental to the accurate operation of machine tools.

An important object of my invention is to eliminate backlash in the feed adjustment of machine tools such as, for example, milling machines and the like.

In feed adjusting devices of the general type to which my invention applies, adjustment of the feed member of the machine tool is effected through a driving member engaged with a driven member. As is well known to those skilled in the art, when two members are operating in engagement with each other, the engaged portions thereof tend to wear somewhat and, ultimately, because of the wear of the engaged portions the engagement between the two members tends to loosen.

It is another important object of my invention to enable the relative position of the driven member and driving member of such a device to be adjusted in a novel and expeditious manner so as to compensate for this normal wear and maintain a close fitting engagement therebetween.

Normally, in machine tools of the type heretofore known in the art, adjustment of the feed of a machine, and the maintenance of that adjustment, has been accomplished by two separate mechanisms. For example, it has heretofore been common practice in the machine tool art to adjust the position of the cutting tool or the like, with the use of one device, and, after the adjustment of the tool has been accomplished, to then lock the tool in this position by the use of a separate device such as a spindle lock, or the like. Obviously, such procedure requires two separate and distinct operations on the part of an operator during the adjustment of the position of a cutting tool and is especially laborious and otherwise undesirable during the finishing operations on a work piece wherein a series of relatively thin finishing cuts, or the like, may be successively taken, with the cutting tool being advanced very slightly between the successive cuts.

It is an object of my invention to provide a novel feed adjustment device which is operable both to adjust the feed mechanism of tools, and to retain the feed mechanism in such adjusted position, in a practical and efficient manner.

A further object is to afford a novel feed adjustment device which is automatically effective to positively retain the feed adjustment of a machine tool, or the like, upon completion of a feed adjusting operation of the device, so that it is unnecessary for the operator to perform a separate locking operation each time that an adjustment of the feed of the machine is made.

Yet another object of my invention is to afford a feed adjustment device which is effective to strongly support the feed mechanism of a machine tool adjusted thereby in a novel and expeditious manner.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

A typical embodiment of my invention is illustrated in Figs. 1 to 7, inclusive, of the drawings, wherein is shown a portion of a milling machine M embodying a cylindrical-shaped spindle S reciprocably mounted in a bore B in a housing H, a feed adjustment device D being mounted on the housing H for adjusting the position of the spindle S longitudinally in the bore B. The spindle S may be of any suitable form such as that shown in my co-pending application, Serial No. 25,765, filed May 7, 1948.

Figure 1:
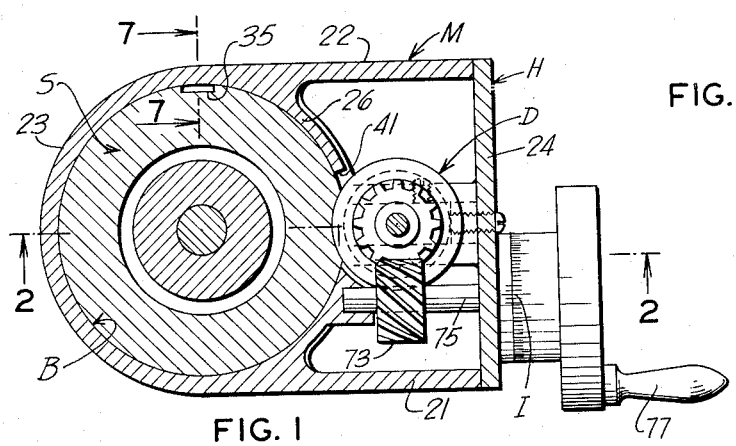
Fig. 1 is a sectional view of a feed adjustment device embodying the principles of my invention, showing the feed adjustment device attached to a machine tool.
Figure 5:
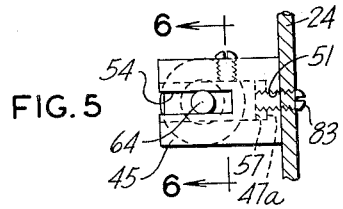
Fig. 5 is a detail sectional view taken substantially along the line 5—5 in Fig. 2.
Figure 6:
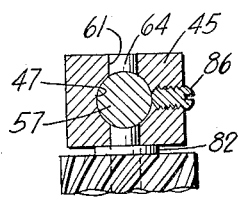
Fig. 6 is a detail sectional view taken substantially along the line 6—6 in Fig. 5.

As is best seen in Fig. 1, the housing H comprises two side walls 21 and 22, two end walls 23 and 24, and an intermediate wall, or partition wall 26 extending between the side walls 21 and 22, the end wall 23 and the partition wall 26 forming arcuate extensions of portions of the side walls 21 and 22 to afford the cylindrical-shaped bore B. The spindle S is reciprocable in a longitudinal direction in the bore B and is restrained from rotating therein by a key 31 secured to the side wall 22 by suitable means such as screws 33 and extending into a slot or keyway 35, Figs. 1 and 7, formed in the spindle S.

A feed rack 38, comprising a plurality of suitable tapered threads 39 is formed on one side of the spindle S, with the threads 39 spaced longitudinally therealong, and is disposed in alignment with a slot 41 formed in the partition wall 26, the key 31 being effective to hold the spindle S against rotation in the bore B, as previously mentioned, to thereby maintain the rack 38 in alignment with the opening 41. The feed rack 38 affords means engageable through the slot 41 by feeding mechanism on the feed adjustment device D, to thereby effect longitudinal movement of the spindle S in the bore B, during actuation of the feed adjustment device D, as will be presently discussed in greater detail.

Figure 2:
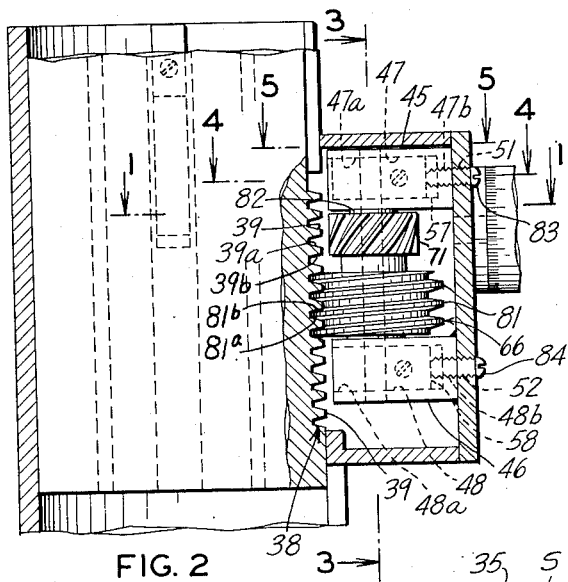
Fig. 2 is a sectional view taken substantially along the line 2—2 in Fig. 1.
Figure 3:
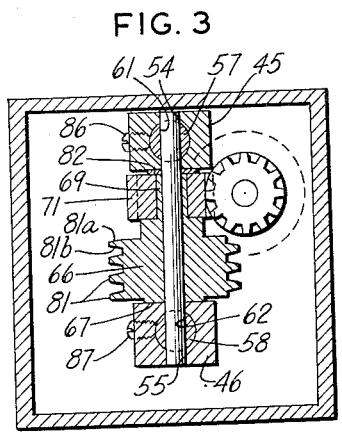
Fig. 3 is a sectional view taken substantially along the line 3—3 in Fig. 2.
Figures 4, 7:
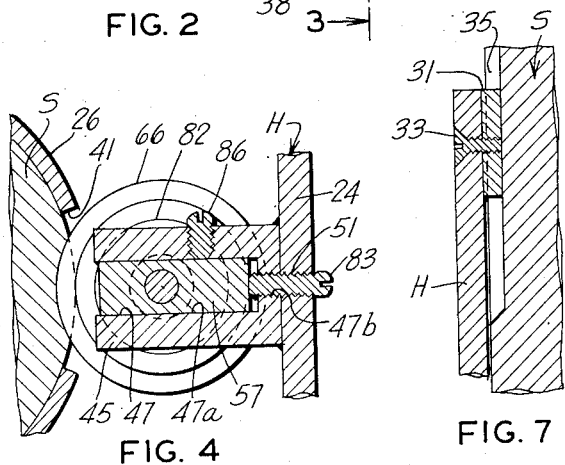
Fig. 4 is a detail sectional view taken substantially along the line 4—4 in Fig. 2.
Fig. 7 is a detail sectional view taken substantially along the line 7—7 in Fig. 1.

The feed adjustment device D comprises two bearing blocks 45 and 46, Figs. 2 and 3, mounted on the inner face of the end wall 24 of the housing H by suitable means such as welding. An elongated bore 47 and 48 extends through each of the bearing blocks 45 and 46, respectively, and each includes an enlarged end portion 47a and 48a and a reduced end portion 47b and 48b, respectively, the reduced end portions 47b and 48b being disposed in axial alignment with complementary openings 51 and 52, respectively, formed in the end wall 24 of the housing H in communication with the reduced end portions 47b and 48b of the openings 47 and 48. The bearing blocks 45 and 46 are disposed in parallel relation to each other on the side wall 24 of the housing H and have elongated slots 54 and 55 extending therethrough, Figs. 3 and 5, in alignment with the longitudinal axis of the bearing blocks 45 and 46 and the longitudinal openings 47 and 48 therein, one end of the slots 54 and 55 and opening outwardly through the end portions of the bearing blocks 45 and 46 in which the enlarged portions 47a and 48a of the openings 47 and 48 are disposed, and the other end of the slots 54 and 55 terminating in spaced relation to the reduced portions 47b and 48b of the openings 47 and 48, respectively.

Two bearings 57 and 58 are slidably mounted in the enlarged portions 47a and 48a of the openings 47 and 48 and have cylindrical-shaped openings 61 and 62 extending transversely therethrough. When the slidable bearings 57 and 58 are mounted in operative position in the bearing blocks 45 and 46, the openings 61 and 62 in the slidable bearings are disposed in alignment with the slots 54 and 55 formed in the bearing blocks 45 and 46, and an elongated shaft 64 is snugly but rotatably journaled in the openings 61 and 62. The close fit between the shaft 64 and the slidable bearings 57 and 58 should be carefully maintained so as to eliminate undesirable lateral movement of the shaft 64 in the openings 61 and 62, as will be discussed presently.

A worm 66, Figs. 2 and 3, is mounted on the shaft 64 for rotation therewith, and has one face 67 engaged with the bearing block 46, Fig. 3. A hub member 69 projects from the other face of the worm 66, and a spiral gear 71 is mounted thereon for rotation with the worm 66. The worm 66 is preferably mounted on the shaft 64 with a shrink fit, so as to be firmly connected thereto and rotatable therewith; and the spiral gear 71 is preferably mounted on the hub 69 of the worm 66 with a similar fit so as to be rotatable therewith. However, as will be appreciated by those skilled in the art, other means such as, for example, pins or keys may be used, if desired, to effect this positive connection between these three members.

A gear 73, Figs. 1 and 3, which is fast to a shaft 75 journaled in the partition walls 26 and 24, is engaged with the gear 71 and is effective to rotate the latter and, therefore, the worm 66, upon rotation of the shaft 75. One end of the shaft 75 extends outwardly through a boss 76 on the end wall 24 of the housing H, and a crank 77 is mounted on the latter end of the shaft 75, exteriorly of the housing H and affords means whereby the shaft 75, and, therefore, the gears 73, 71 and 66 may be rotated. If desired, suitable indicia I, Fig. 1, may be afforded on the crank 77 and the boss 76 to indicate the position of the crank 77, as will be understood by those skilled in the art.

The bearing blocks 45 and 46 are so disposed on the end wall 24 of the housing H that the shaft 64 and the worm 66 are disposed in parallel relation to the opening 41 in the partition wall 26, and the feed rack 38 on the spindle S. The threads 81 on the worm 66 are complementary to and engageable with the threads 39 on the spindle S, and the bearing blocks 45 and 46 and the slidable bearings 57 and 58 are so disposed in the housing H that when the slidable bearings 57 and 58 are disposed in proper position in the bearing blocks 45 and 46, the threads 81 on the worm 66 are drivingly engaged with the threads 39 on the feed rack 38 of the spindle S.

As previously mentioned, the threads 39 are tapered threads, and the threads 81 are complementary thereto. For the purposes of my invention it is preferable that the threads 39 and 81 formed on the spindle S and the worm 66, respectively, be Acme threads, whereby, when the worm 66 is firmly engaged with the rack 38, the oppositely disposed tapered faces 81a and 81b of the threads 81 are firmly engaged with corresponding faces 39a and 39b of the threads 39 engaged by the threads 81 to thereby afford a wedging engagement between the threads 81 on the worm 66 and corresponding threads 39 on the rack 38 which is effective to hold the spindle S against longitudinal movement in either direction relative to the worm 66.

It will be seen that, with the spindle S and the worm 66 engaged in the aforementioned manner wherein the spindle S is held against longitudinal movement relative to the worm 66, when the worm 66 is mounted in the housing H in a manner to prevent longitudinal movement of the worm 66 relative to the housing H, the spindle S is likewise held against longitudinal movement relative to the housing H. To effect such positive longitudinal positioning of the worm 66 in the housing H I prefer to mount suitable spacers such as the spacer or shim 82 between the bearing block 45 and the spiral gear 71, Figs. 2 and 3, to thereby press the opposite face of the worm 66 into snug, but not tightly binding, engagement with the adjacent face of the bearing block 46. As wear occurs between the worm 66 and the bearing block 46, or between the spiral gear 71, the spacer 82, and the bearing block 45, heavier shims may be substituted for, or added to the shim 82 to thereby maintain a snug engagement between the bearing blocks 45 and 46 and the spiral gear 82 and the worm 66 and thereby prevent undesired longitudinal movement of the worm 66.

For adjusting the position of the shaft 64 and, therefore, the worm 66 relative to the rack 38 on the spindle S, to thereby afford the aforementioned firm interengagement of the worm 66 with the rack 38, I afford means for effectively adjusting the position of the slidable bearings 57 and 58 in the bearing blocks 45 and 46. Thus, as is best seen in Figs. 2, 4, 5 and 6, screws 83 and 84, having outwardly projecting heads, are threadedly engaged in the openings 47b and 51 and the openings 48b and 52, respectively, and abut the outer ends of the slidable bearings 57 and 58, respectively. Thus, it will be seen that by turning the screws 83 and 84 in the proper direction, the slidable bearings 57 and 58 may be released for movement away from the spindle S, or may be forced inwardly by the screws 83 and 84 toward the spindle S. The slidable bearings 57 and 58 preferably fit snugly in the openings 47 and 48 so as to eliminate undesirable lateral movement of the bearings 57 and 58 relative to the bearing blocks 45 and 46. In addition, two set screws 86 and 87 are threaded into the bearing blocks 45 and 46 and are engageable with the sides of slidable bearings 57 and 58, respectively, to thereby afford means for effectively securing the slidable bearings 57 and 58 in the adjusted positions determined by the positions of the screws 83 and 84, the set screws 86 and 87 being effective to press the slidable bearings 57 and 58 into binding engagement with the opposite side walls of the openings 47 and 48 to thereby insure that the slidable bearings 57 and 58 will not move either laterally or longitudinally in the openings 47 and 48. If for any reason, such as, for example, if wear between the worm 66 and the rack 38 causes the interengagement thereof to loosen somewhat, it subsequently is desirable to re-adjust the position of the worm 66 relative to the spindle S, this may be readily accomplished by loosening the set screws 86 and 87, and, upon rotating the adjusting screws 83 and 84 in the proper direction shifting the position of the slidable bearings 57 and 58 in the bearing blocks 45 and 46. In this connection, it will be seen that, if, because of wear, the engagement between the threads 81 on the worm 66 and the threads 39 on the rack 38 becomes loosened so as to permit undesired free movement between the spindle S and the worm 66, the threads 81 on the worm 66 may be positively moved back into firm wedging engagement with the threads 39 on the rack 38 by rotating the screws 83 and 84 in the proper direction to thereby feed the latter into the bearing blocks 45 and 46 and push the slidable bearings 57 and 58 to the left as viewed in Fig. 2.

Thus, it will be seen that with my novel feed adjustment device shown in Figs. 1 to 7, inclusive, the worm 66 may be originally disposed in efficient engagement with the rack 38 on the spindle S by properly adjusting the slidable bearings 57 and 58 in the bearing blocks 45 and 46 and locking the same in these positions by adjustment of the set screws 86 and 87. When so positioned, it will be seen that the Acme threads 81 on the worm 66 are firmly engaged with corresponding Acme threads 39 on the spindle S so that the threads 81 are firmly wedged between the corresponding threads 39 to thereby eliminate backlash therebetween, and are effective to hold the spindle S against longitudinal movement in the housing H.

In addition, it will be seen that the pressure applied between the teeth 39 on the spindle S and the teeth 81 on the worm 66 is exerted substantially parallel to the axis of rotation of the worm 66 so that pressure applied to the worm 66 by the spindle S has little tendency to rotate the worm 66, and the worm 66 is capable of acting as an effective locking mechanism for normally holding the spindle S against longitudinal movement without resorting to additional locking mechanism.

Furthermore, it will be seen that unlike adjustment devices known in the prior art wherein spur gears or the like were used to adjust spindles and the like, and wherein the spindles supported by such gears were fully supported by only one gear tooth and were only partially engaged by other teeth, all the threads 81 on the worm 66 are fully engaged with threads 39 on the spindle S and afford a strong support therefor.

Also, it will be seen that with my device, all backlash between adjusting device D, worm 66 and the spindle S, which may affect the proper adjustment of the spindle S in the bore B, may be effectively eliminated by properly adjusting the slidable bearings 57 and 58 in the bearings 45 and 46 to eliminate the backlash between the worm 66 and the spindle S, even though backlash may still remain between the handle 77 and the gear 71. This latter is a practical matter of consideration because it will be seen that in constructing a feed adjustment device in accordance with the principles of my invention, with the Acme threads 39 and 81 carefully formed, and with the shaft 64 snugly fitted into the slidable bearings 57 and 58, and the slidable bearings 57 and 58 snugly fitted into the bearing blocks 45 and 46, the remaining portions of the feed adjustment device D need not be carefully fitted but may be fitted even outside the usual commercial tolerances without affecting the efficient operation of my device because it is immaterial how much backlash there is between the handle 77 and the gear 71, this latter backlash having no effect on the backlash between the spindle S and the feed adjustment device D.

Figure 8:
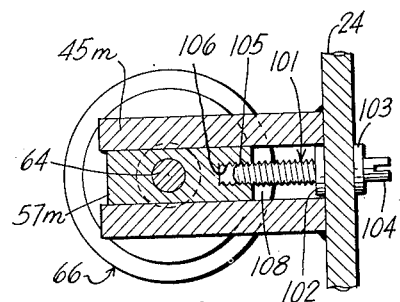
Fig. 8 is a detail sectional view somewhat similar to Fig. 4 but showing a modified form of my invention.

The modified form of my invention which I have shown in Fig. 8 operates on the same principle as the preferred form of my invention illustrated in Figs. 1 to 7, inclusive, and like reference numerals have been used on like parts and the same reference numerals with the suffix m have been used on parts which are similar but which have been substituted for parts of the preferred form of my invention.

The changes shown in Fig. 8 over the construction of the device shown in Figs. 1 to 7, are embodied entirely in the adjustment mechanism for adjusting the slidable bearings 57 and 58 in the bearing blocks 45 and 46. Thus, it will be seen that in Fig. 8, the adjusting screws 83 and 84 and the set screws 86 and 87 shown in Figs. 1 to 7, have been eliminated and an adjusting screw 101 is rotatably mounted in the side wall 24 of the housing H and is secured therein against longitudinal movement therethrough by suitable members such as collars 102 and 103. The head 104 of the screw 101 projects outwardly from the end wall 24 and affords means for rotating the screw. The other end portion of the screw 101 has threads 105 formed thereon which are engaged with threads 106 formed in a slidable bearing 57m mounted in a bearing block 45m in the same manner that the slidable bearings 57 and 58 are mounted in the bearing blocks 45 and 46. The bearing block 45m has a recess 107 formed therein, within which the collar 102 is disposed.

The threaded end portion of the screw 101 is journaled in an opening 108 in the bearing block 45m and thus it will be seen that by rotating the screw 102 the slidable bearing 57m may be adjusted in the bearing block 45m, the threads 105 on the longitudinally fixed screw 102 being effective to move the slidable bearing 57m toward or away from the wall 24 in accordance with the direction in which the screw 101 is rotated.

From the foregoing it will be seen that I have afforded a novel feed adjustment device which is operable to adjust and support feed mechanism of machine tools and the like in a novel and expeditious manner.

Also it will be seen that I have provided a novel feed adjustment device wherein backlash between the device and mechanism to be adjusted thereby may be effectively and efficiently eliminated.

In addition, it will be seen that I have afforded a novel feed adjustment device which is practical and efficient in operation and may be economically manufactured.

Thus, while I have illustrated and described preferred embodiments of my invention, it is to be understood that these are capable of variation and modification and I therefore do not wish to be limited to the precise details set forth, but desire to avail myself of such changes and alterations as fall within the purview of the following claims:

I claim:

1. In a machine tool embodying a housing, and an elongated spindle reciprocably mounted in said housing for longitudinal adjustment therein, a pair of bearings mounted on said housing in spaced relation to each other, a second pair of bearings mounted in said first mentioned bearings, each of said second bearings being movably mounted on a corresponding one of said first mentioned bearings for movement in a predetermined range toward and away from said spindle, a shaft rotatably mounted in said second pair of bearings, a gear mounted on said shaft for rotation therewith, said gear having tapered teeth operatively engaged with said spindle for moving said spindle longitudinally in said housing during rotation of said gear with said shaft, and means for moving said second bearings in said predetermined range of movement on said first mentioned bearings to thereby adjust the position of said shaft relative to said spindle and thereby adjust the operative engagement of said gear teeth with said spindle.

2. In a machine tool embodying a housing, and an elongated spindle reciprocably mounted in said housing for longitudinal adjustment therein, a pair of bearings mounted on said housing in spaced relation to each other, a second pair of bearings mounted on said first mentioned bearings, each of said second bearings being movably mounted on a corresponding one of said first mentioned bearings for movement through an adjusting movement toward and away from said spindle, a shaft rotatably mounted in said second pair of bearings, a gear mounted on said shaft for rotation therewith between said second bearings, said gear including tapered teeth having oppositely disposed faces disposed at predetermined angles and operatively engaging said spindle for moving said spindle longitudinally in said housing upon rotation of said gear, and means mounted in said first mentioned bearings for moving said second bearings in said adjusting movement toward said spindle to thereby urge said shaft toward said spindle and move said oppositely disposed faces on predetermined ones of said teeth into oppositely camming engagement with said spindle.

3. In a machine tool embodying a housing, and an elongated spindle reciprocably mounted in said housing for longitudinal movement therein, a pair of bearings mounted on said housing, a second pair of bearings, each of said second bearings being mounted on a corresponding one of said first mentioned bearings, a shaft rotatably mounted in said second pair of bearings, a gear mounted on said shaft for rotation therewith, said gear including teeth having oppositely tapered faces, said second bearings being movable on said first mentioned bearings into a predetermined position to thereby move said oppositely tapered faces on predetermined ones of said teeth into oppositely camming operative engagement with said spindle for moving the latter longitudinally in said housing during rotation of said gear, and means mounted on said first mentioned bearings for releasably retaining said second bearings in said predetermined position.

4. In a machine tool embodying a housing, and an elongated spindle reciprocably mounted in said housing for longitudinal movement therein, a pair of bearings mounted on said housing, each of said bearings having an end disposed adjacent to said spindle and another end disposed on the opposite side of said first mentioned end from said spindle, a second pair of bearings, each of said second bearings being slidably mounted on a corresponding one of said first mentioned bearings for movement toward and away from said spindle, a gear rotatably mounted on said second pair of bearings and supported thereby, said gear being operatively engageable with said spindle for moving the same longitudinally in said housing when said second pair of bearings are disposed in a predetermined position on said first mentioned bearings, and means for moving said second bearings into said predetermined position, said means comprising threaded members mounted in said other ends of said first mentioned bearings and engaged with said second bearings.

5. In a machine tool embodying a housing, and an elongated spindle reciprocably mounted in said housing for longitudinal movement therein, a pair of bearings mounted on said housing, each of said bearings having an end disposed adjacent to said spindle and another end disposed on the opposite side of said first mentioned end from said spindle, a second pair of bearings, each of said second bearings being slidably mounted on a corresponding one of said first mentioned bearings for movement toward and away from said spindle, a gear rotatably mounted on said second pair of bearings and supported thereby, said gear being operatively engageable with said spindle for moving the same longitudinally in said housing when said second pair of bearings are disposed in a predetermined position on said first mentioned bearings, and means for moving said second bearings into said predetermined position, said means comprising elongated threaded members mounted in and threadedly engaged with said other ends of said first mentioned bearings and abutting said second bearings.

6. In a machine tool embodying a housing, and an elongated spindle reciprocably mounted in said housing for longitudinal movement therein, a pair of bearings mounted on said housing, each of said bearings having an end disposed adjacent to said spindle and another end disposed on the opposite side of said first mentioned end from said spindle, a second pair of bearings, each of said second bearings being slidably mounted on a corresponding one of said first mentioned bearings for movement toward and away from said spindle, a gear rotatably mounted on said second pair of bearings and supported thereby, said gear being operatively engageable with said spindle for moving the same longitudinally in said housing when said second pair of bearings are disposed in a predetermined position on said first mentioned bearings, and means for moving said second bearings into said predetermined position, said means comprising elongated members rotatably mounted in said housing and secured therein against longitudinal movement, each of said members being rotatably mounted in a corresponding one of said first mentioned bearings and being threadedly engaged with said second bearing mounted thereon.

7. In a machine tool embodying a housing, and an elongated spindle reciprocably mounted in said housing for longitudinal movement therein, a pair of bearings mounted on said housing, each of said bearings having an end disposed adjacent to said spindle and another end disposed on the opposite side of said first mentioned end from said spindle, a second pair of bearings, each of said second bearings being slidably mounted on a corresponding one of said first mentioned bearings for movement toward and away from said spindle, a gear rotatably mounted on said second pair of bearings and supported thereby, said gear being operatively engageable with said spindle for moving the same longitudinally in said housing when said second pair of bearings are disposed in a predetermined position on said first mentioned bearings, and means for moving said second bearings into said predetermined position, said means comprising elongated members rotatably mounted in said housing, collars fixedly mounted on said elongated members on opposite sides of a portion of said housing for holding said elongated members in fixed longitudinal position in said housing, each of said elongated members having one end for rotating said member, and having another end journaled in a corresponding one of said first mentioned bearings, said other end of each of said elongated bearings being threadedly engaged with said second bearing mounted on said corresponding first mentioned bearing for moving said second bearing on said corresponding first mentioned bearing upon rotation of said elongated member in said housing and said first mentioned bearing.

8. In a machine tool embodying a housing, and an elongated spindle reciprocably mounted in said housing for longitudinal adjustment therein, said spindle having a feed rack extending longitudinally along one side thereof, said rack comprising threads, a pair of bearing members mounted on said housing in spaced relation to each other, each of said bearings having an elongated opening therein, said openings being disposed in parallel relation to each other, each of said bearings having a slot extending therethrough in communication with, and transversely to, said elongated opening in said bearing, a pair of elongated bearing members mounted in said elongated openings, each of said elongated bearing members being mounted in a corresponding one of said elongated openings in axial alignment with said corresponding first mentioned bearing member, each of said elongated bearing members having a cylindrical-shaped opening extending therethrough in alignment with said slot in said corresponding one of said first mentioned bearings, an elongated shaft snugly mounted in said cylindrical-shaped openings for rotation therein, a worm mounted on said shaft between said first mentioned bearings for rotation with said shaft, said worm having threads complementary to, and operatively engaged with said threads on said spindle for moving said spindle longitudinally in said housing upon rotation of said gear, means for rotating said shaft, said elongated bearing members being movable longitudinally in said elongated openings along a predetermined path toward and away from said spindle to thereby move said shaft toward and away from said spindle and adjust the operative engagement of said threads on said gear with said threads on said spindle, and screw means mounted in said first mentioned bearings for adjusting the position of said elongated bearings along said predetermined path to thereby adjust the position of said shaft relative to said spindle and thereby adjust the operative engagement of said threads on said gear with said threads on said rack.

RAYMOND C. PALMER.

REFERENCES CITED

The following references are of record in the file of this patent:

UNITED STATES PATENTS

| Number | Name | Date |
| --- | --- | --- |
| 106,360 | Hamlin | Aug. 16, 1870 |
| 1,035,340 | Fresh | Aug. 13, 1912 |
| 1,670,413 | Kneidl | May 22, 1928 |
| 1,981,216 | Archea | Nov. 20, 1934 |
| 2,507,555 | Berthiez | May 16, 1950 |